(12) United States Patent
Leifert

(10) Patent No.: US 7,000,716 B2
(45) Date of Patent: Feb. 21, 2006

(54) INDUSTRIAL TRUCK

(75) Inventor: Torsten Leifert, Gögelsen (DE)

(73) Assignee: Still GmbH, (DE)

( * ) Notice: Subject to any disclaimer, the term of this patent is extended or adjusted under 35 U.S.C. 154(b) by 80 days.

(21) Appl. No.: 10/662,131

(22) Filed: Sep. 12, 2003

(65) Prior Publication Data

US 2004/0129466 A1 Jul. 8, 2004

(30) Foreign Application Priority Data

Sep. 13, 2002 (DE) ............................... 102 42 619

(51) Int. Cl.
*B60K 3/00* (2006.01)
(52) U.S. Cl. .................. 180/65.1; 180/65.2; 180/65.3; 180/68.5
(58) Field of Classification Search ................ 180/165, 180/65.2, 65.3, 65.1, 65.5, 68.5, 65.4; 429/26, 429/12
See application file for complete search history.

(56) References Cited

U.S. PATENT DOCUMENTS

| | | | | |
|---|---|---|---|---|
| 5,964,089 A | * | 10/1999 | Murphy et al. | ............... 60/286 |
| 6,054,838 A | * | 4/2000 | Tsatsis | ........................ 320/101 |
| 6,378,637 B1 | * | 4/2002 | Ono et al. | ................. 180/65.3 |
| 6,508,324 B1 | * | 1/2003 | Conley, Jr. | .................. 180/165 |
| 6,516,905 B1 | * | 2/2003 | Baumert et al. | ........... 180/53.8 |
| 6,536,487 B1 | * | 3/2003 | Ovshinsky et al. | ......... 141/231 |
| 6,648,085 B1 | * | 11/2003 | Nagura et al. | ............. 180/65.1 |
| 6,651,701 B1 | * | 11/2003 | Kuriiwa et al. | ................ 141/4 |
| 6,708,719 B1 | * | 3/2004 | Idoguchi | ..................... 137/266 |
| 6,830,117 B1 | * | 12/2004 | Chernoff et al. | ........... 180/65.1 |
| 6,834,737 B1 | * | 12/2004 | Bloxham | .................... 180/165 |
| 6,874,588 B1 | * | 4/2005 | Kato et al. | ................. 180/65.3 |

* cited by examiner

*Primary Examiner*—J. Allen Shriver
(74) *Attorney, Agent, or Firm*—The Webb Law Firm

(57) ABSTRACT

An industrial truck, such as a fork-lift truck, has an electrical drive system and an energy supply based on gaseous media. At least one pressure vessel for the storage of at least one gaseous medium is installed in a mounting device which can be easily replaced together with the pressure vessel in the lower portion of the industrial truck (5) between the axles (7). Devices necessary for the generation of electrical energy from the gaseous medium can be advantageously installed in the mounting device.

14 Claims, 4 Drawing Sheets

INDUSTRIAL TRUCK

BACKGROUND OF THE INVENTION

1. Field of the Invention

This invention relates to an industrial truck, such as a fork-lift truck, with an electrical drive system and an energy supply based on gaseous media.

2. Technical Considerations

An internal combustion engine is the preferred power source in industrial trucks that are required to have relatively high load-carrying capacities and performance requirements. Diesel engines are in very widespread use in these applications because they can be operated very economically and the fuel supply system is simple. However, diesel engines cannot be used if the truck is frequently operated indoors, such as in closed factory buildings, for example.

Battery-operated industrial trucks need very large battery capacities and, therefore, require long charging times to achieve the required high performance. To reduce down times, discharged batteries can be removed completely and replaced with charged batteries. For this purpose, the batteries are generally located in a tray-shaped device which, on counterweighted fork-lift trucks, is located between the axles underneath the driver's seat. However, the replacement of this battery tray is a very complex operation and the maintenance of a supply of replacement batteries is expensive.

An alternative to battery operation is offered by gas-powered fork-lift trucks. On these trucks, an internal combustion engine is operated with a mixture of gases, generally propane and butane or natural gas, which can be stored in appropriate pressure vessels. Some gases and mixtures of gases, such as mixtures of propane and butane for example, can be in liquid form at room temperature if under sufficiently high pressure. For purposes of the following discussion, these liquefied gases are also to be considered a "gaseous medium". The emissions levels for this type of gas propulsion system are significantly lower than for diesel engines, while costs and down times are significantly less than with battery operation because the fuel tanks are generally located so that empty tanks can easily be replaced with full tanks. In addition, the costs of purchasing and maintaining these trucks are lower than for an industrial truck that has an electrical propulsion system and its related batteries and recharging units.

Fuel cell technology offers an alternative to both gas-powered operation and battery operation. Here too, an energy source that is in the form of a gas at room temperature is used, generally hydrogen, along with one which can be stored in liquid form in a thermally insulated pressure vessel. Hydrogen as an energy source can also be used as fuel in an internal combustion engine to which modifications have been made. The hydrogen tank is installed in a manner similar to that used for the attachment of a gas tank. For example, on a counterweighted fork-lift truck, the hydrogen tank is installed on the counterweight. The advantage of a fuel cell system is primarily the total absence of harmful emissions and simultaneously its very high efficiency. Therefore, it is frequently desirable to convert industrial trucks that have an electrical propulsion system so that they can use this energy source. However, the cost of this conversion is significant on account of the gas supply system that must be installed.

Gas tanks for gases under pressure are generally installed in the upper outside area of the industrial truck, for example on counterweighted fork-lift trucks on the counterweight, because they must be easily replaceable and, therefore, readily accessible. However, in that area, they frequently interfere with the operator's field of vision, in particular when the industrial truck is being operated in reverse, and may not be sufficiently protected against damage. With this layout, moreover, the two essential components of the energy supply, namely the energy storage mechanism and the energy converter, are located separately from each other, which requires long lines or conduits that are complex and are expensive to install.

Therefore, it is an object of the invention to provide an industrial truck, such as a fork-lift truck, that has an electrical drive system and an energy supply based on at least one gaseous medium, which has an unrestricted field of view for the driver on all sides, a secure installation of easily replaceable pressurized fuel tanks, and a compact layout of the components used to generate the electrical energy.

SUMMARY OF THE INVENTION

The invention provides an industrial truck having at least one pressure vessel for the storage of at least one gaseous medium installed in a mounting device that can be easily replaced together with the pressure vessel in the lower area of the industrial truck, e.g., between the axles.

Because the pressure vessel is located in the lower area of the industrial truck, e.g., between the axles, the pressure vessel is underneath the operator and, therefore, does not interfere with the operator's field of vision. Simultaneously, the pressure vessel is protected against damage and is located in the vicinity of the energy converter, which means that there is a compact layout of the components of the energy supply with short lines running between them. The installation of the pressure vessel in a mounting device that can be replaced together with the pressure vessel facilitates the handling of the pressure vessel and thereby makes it possible to remove an empty pressurized tank and replace it with a full one quickly and easily.

It is particularly advantageous if the pressure vessel can be refilled while it is still in the industrial truck. The complicated and time-consuming process of removing and replacing the empty pressure vessel is, therefore, replaced by a simple refueling process.

Additional devices needed for the generation of electrical energy from the gaseous medium and, in particular, all of the essential devices, can be advantageously installed in the mounting device which can be easily replaced along with the pressurized fuel tanks. The components are thereby arranged as compactly as possible and the entire mounting device can be replaced as a single unit. This capability is advantageous during maintenance work and so that the energy supply can be used in different industrial trucks.

In one particularly advantageous embodiment of the invention, the mounting device, which can be replaced easily along with the pressure vessel, corresponds to a battery tray in terms of its mechanical connecting elements and electrical connections. The mounting device can, therefore, also be used in other industrial trucks that use the corresponding battery tray.

It is particularly advantageous if the devices and connections of the industrial truck for accepting a mounting device that can be easily replaced along with the pressure vessel are designed so that they can also accept a battery tray. The industrial truck can thereby be easily converted from operation with energy generated by the gaseous medium or media to battery-powered operation.

It is furthermore advantageous if a fuel cell system is used to generate electrical energy from the gaseous medium. This arrangement achieves high efficiency and produces emissions that are not hazardous to the environment.

In an additional advantageous configuration of the invention, a conventional internal combustion engine, such as a reciprocating engine, can be used to generate electrical energy from the gaseous medium. These engines are durable, reliable, and easy to manufacture.

It is advantageous if the main flow of the air supply of the devices needed for the generation of electrical energy from the gaseous medium runs at a right angle to the longitudinal axis of the vehicle. There are generally fewer assemblies mounted in the lateral areas of the industrial truck, which means that the routing of the air flow can be realized more easily.

The control and monitoring devices for the various operating systems and devices for the generation of electrical energy can be advantageously installed in a fixed manner in the industrial truck, such as on the driver's control console. The status of these assemblies can thereby be monitored and controlled by the operator.

BRIEF DESCRIPTION OF THE DRAWINGS

Additional advantages and details of the invention are described in greater detail below with reference to the exemplary embodiment illustrated in the accompanying schematic drawings, in which like reference numbers identify like parts throughout.

DESCRIPTION OF THE PREFERRED EMBODIMENTS

Figure 1:
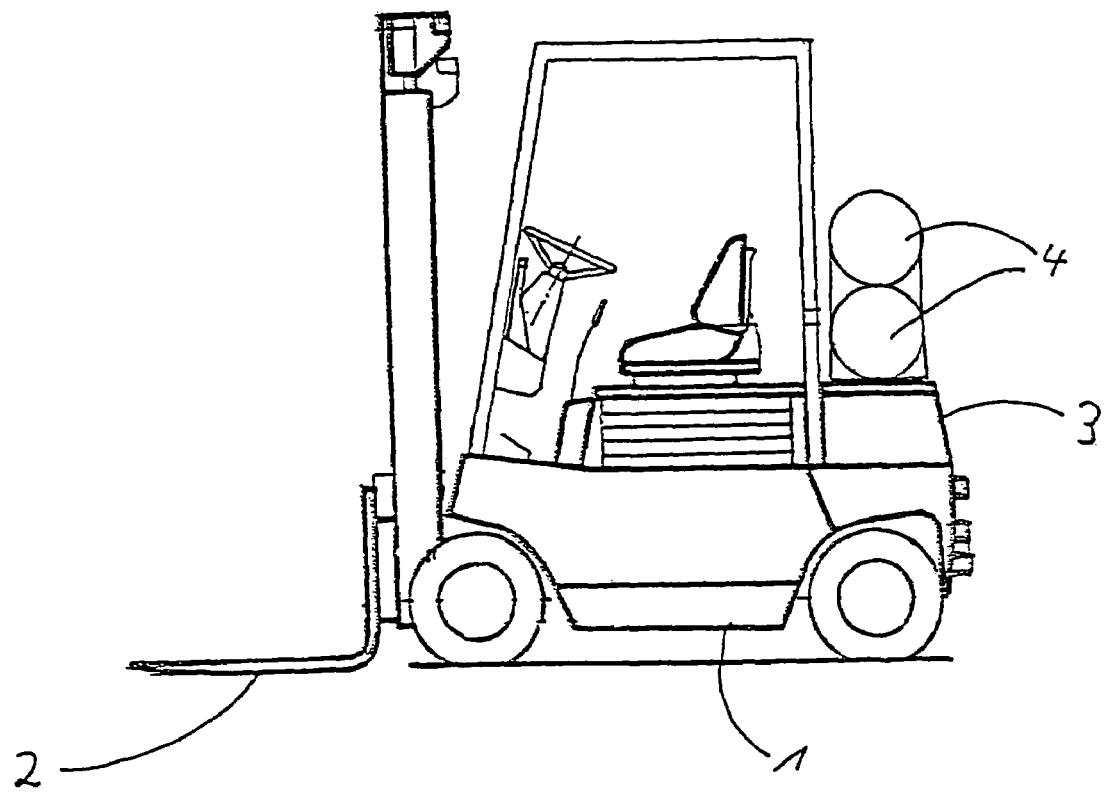
FIG. 1 shows a conventional counterweighted fork-lift truck with a gas-powered drive system.

FIG. 1 shows a conventional counterweighted fork-lift truck 1 with a gas-powered drive system. A counterweight 3 is attached in the rear portion to equalize a load that is transported on a fork 2. To supply the traction motor (not shown) with gas, two tanks 4 holding gas under pressure are attached to the counterweight 3. These gas tanks 4 can interfere with the driver's view, especially when traveling in reverse, and can easily be damaged.

Figure 2:
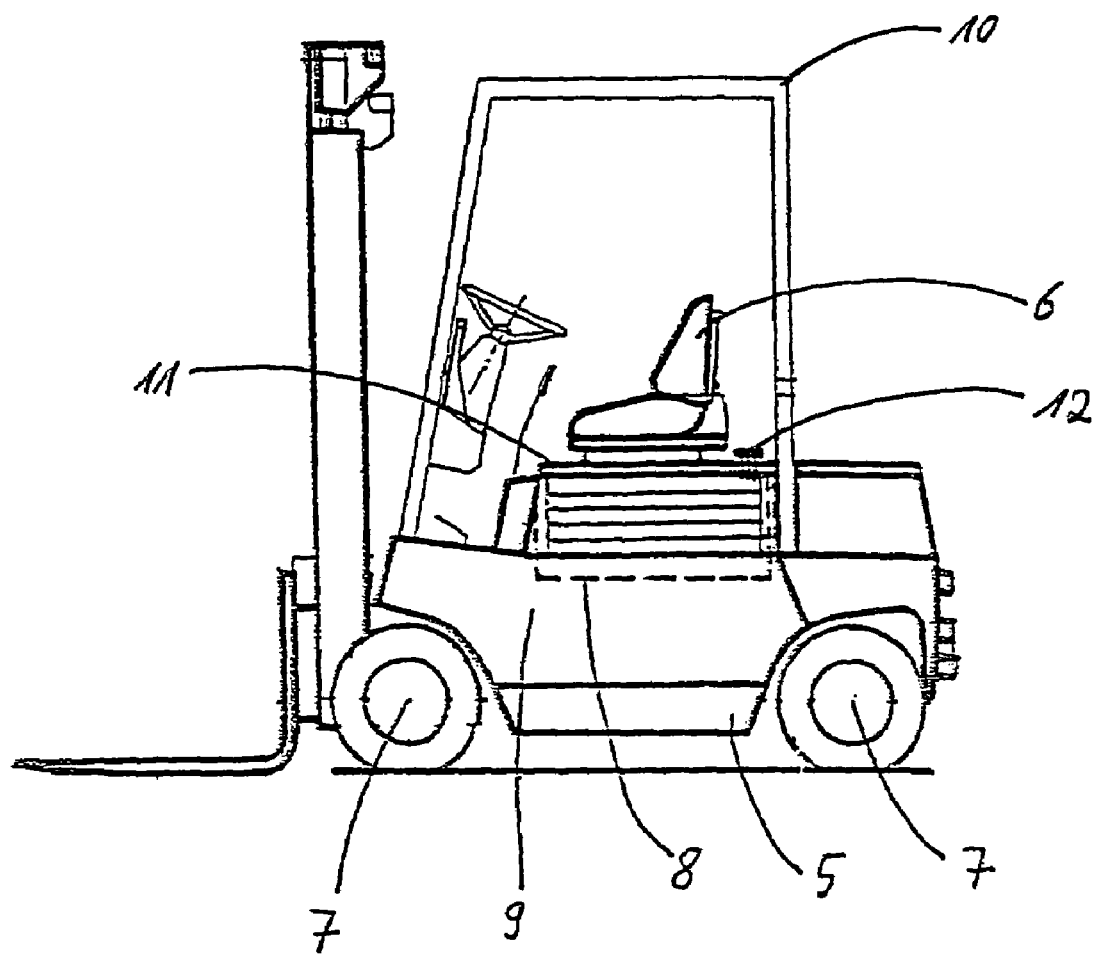
FIG. 2 shows a counterweighted fork-lift truck of the invention.

FIG. 2 shows a counterweighted fork-lift truck 5 as an example of an industrial truck incorporating features of the invention. Underneath the driver's seat 6, between the axles 7, there is a compartment 8 for the installation of a mounting device (not shown) with one or more pressure vessels that contain gas under pressure, such as liquefied gas (gaseous medium). The gaseous medium can be of a single gas or a mixture of gases and can be in a gas phase or can be a liquefied gas. In this area, on conventional fork-lift trucks that have an internal combustion engine, there is usually an internal combustion engine, which means that with a gas-powered drive, the pressurized gas tanks are in the immediate vicinity of the motor. The pressurized gas tanks can be optimally protected from external influences by a frame 9 and a driver's protective cabin 10. It is, nevertheless, relatively easy to replace the pressurized gas tanks, because a cover 11 over the compartment 8 can be easily lifted and then the replacement can proceed similar to the procedure used when replacing the pressurized gas tanks 4 located on the counterweight 3 of the conventional truck 1.

There is no need to replace the pressurized gas tanks if a filling device 12 is attached to the industrial truck 5 or to the mounting device that holds the pressurized gas tanks. By means of the filling device 12, the pressurized gas tanks can be refilled without having to remove them from the vehicle 5. The process of filling the tanks is thereby similar to refueling a vehicle that is operated with liquid fuel and can be completed quickly and without any major effort. A compressed gas line can also be connected using means that are typical for such applications, such as pressure-coded tank nipples, i.e., connections that are designed to be used with specific pressure stages. A placement on the vehicle side that has the step up to the driver's cab is particularly advantageous because the driver, therefore, has to travel only a relatively short distance between the driver's seat 6, the refueling station, and the device 12. The device 12 can be protected against damage by its location behind the step.

Figure 3:
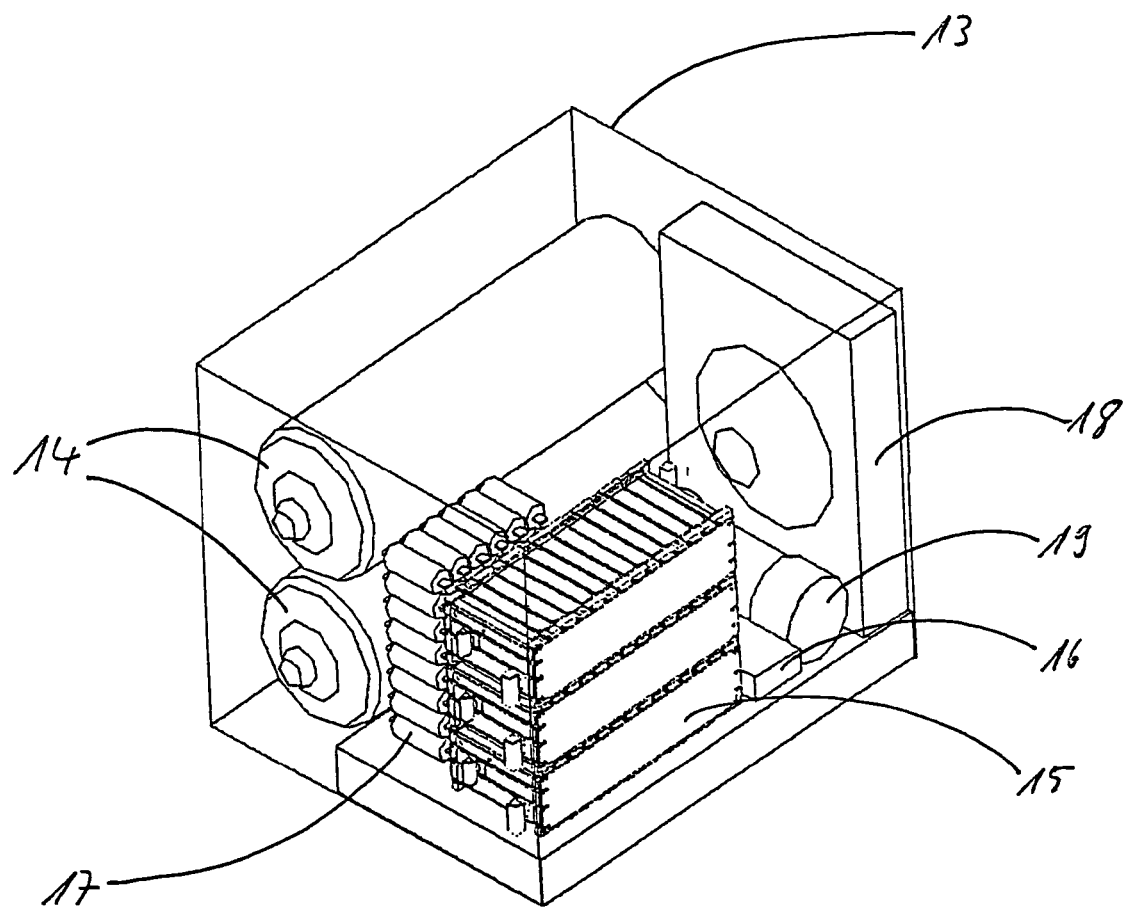
FIG. 3 shows a mounting device with pressure vessels holding gas under pressure and a fuel cell system for an industrial truck in accordance with the invention.
Figure 4:
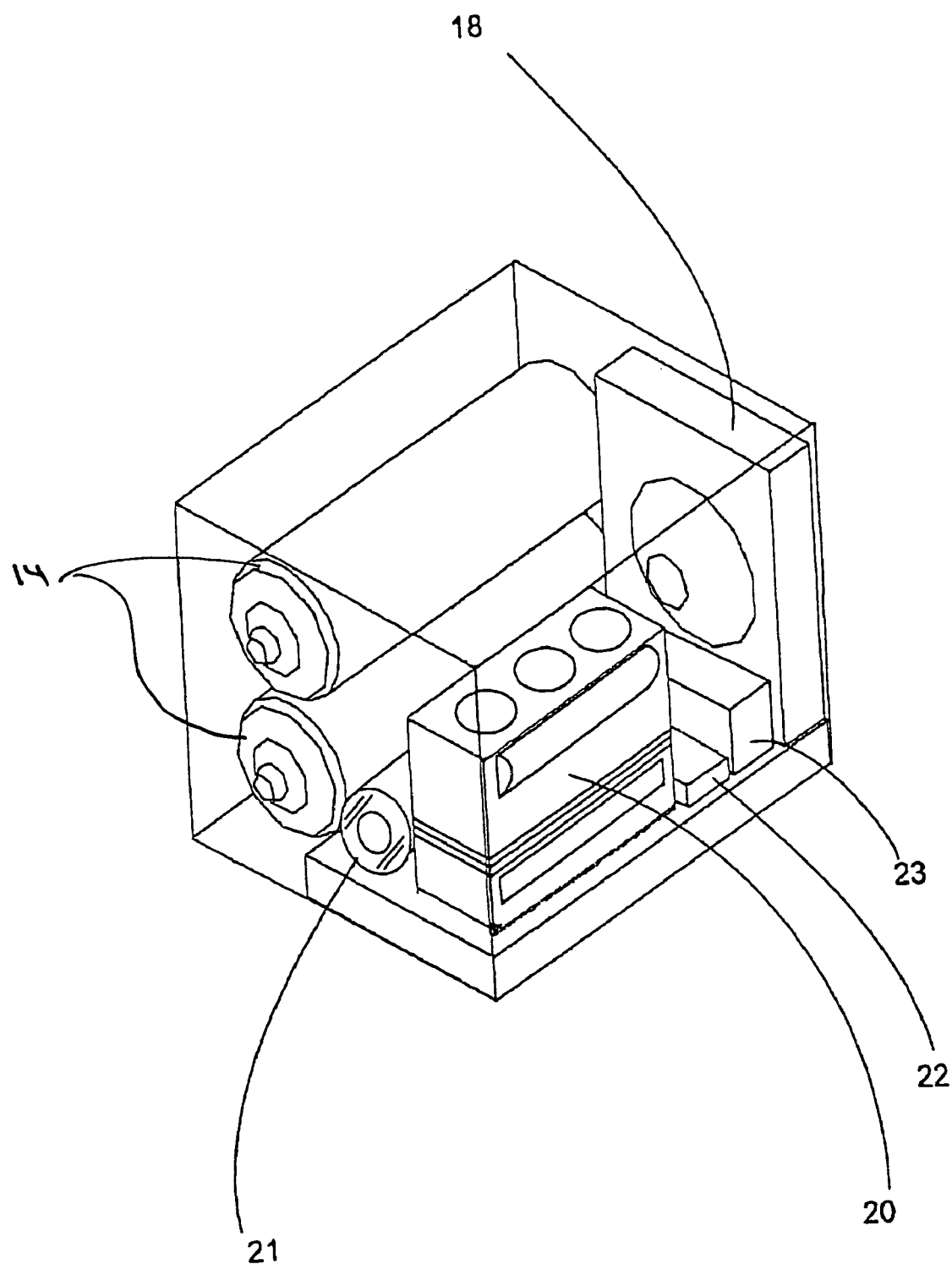
FIG. 4 shows a mounting device with pressure vessels holding a gas and an internal combustion engine configured to generate electrical energy.

An example for a mounting device that can be easily replaced together with the pressurized gas tank is illustrated in FIG. 3. The exemplary embodiment shows a mounting device 13 in which, in addition to the compressed gas tanks 14, additional units for the generation of electrical energy from the compressed gas are installed. These additional units can include a fuel cell system, for example. The mounting device 13 can be configured so that it resembles a tray and, in addition to the pressurized gas tanks 14, also contains one or more fuel cells 15, an electronic control system 16 for the fuel cell unit, a buffer 17 for electrical energy, a cooler 18, and a compressor 19. The compressed gas, such as but not limited to hydrogen, flows from the pressurized tanks 14 to the fuel cells 15. The oxygen required for the oxidation can be supplied with ambient air via the compressor 19. The heat generated during the operation of the fuel cells 15 is discharged via the cooler 18. Therefore, all the units that are used for the generation of electrical energy are combined in the mounting device 13. In an analogous manner, even when an internal combustion engine is used that can be operated with a gas conventionally used for industrial trucks (e.g., a mixture of propane and butane and/or other gases, such as hydrogen), all or most of the major units, such as the motor, generator, electronic control system, cooler, and starter battery, can be located in the mounting device 13. For example, FIG. 4 shows a mounting device having an internal combustion engine 20 connected to the gas tanks 14. The mounting device further includes a generator 21, an electronic control system 22, a cooler 18, and a starter battery 23.

The compact arrangement of all of the major units necessary for the generation of electrical energy from the gaseous medium in the mounting device 13 makes it possible to easily replace the entire energy generation system. For service or repair work on the drive units, the industrial truck can continue to be operated during these activities simply by replacing the current mounting device with a new one. To retrofit an industrial truck in accordance with the invention from operation with one type of energy to the other, for example from gas-powered operation to fuel cell operation, all that is necessary is to replace the mounting device 13 without any modifications to the industrial truck.

The mounting device 13 can be identical in terms of its mechanical connecting elements and electrical connections with a conventional battery tray, and the devices to accept the mounting device 13 in the industrial truck 5 can also be configured so that they can accept a battery tray. Therefore, instead of the mounting device 13, a battery tray can be used, for example, if absolutely zero emissions are required and a gas-powered drive system can be installed in the mounting device 13. For service or repair work on the drive units, the industrial truck can be kept in operation while these activities take place simply by replacing the mounting device 13 with a conventional battery tray. In particular, the connections and devices to hold the battery tray can be configured so that a battery tray that is already present on industrial trucks can be used. This capability is advantageous if a fleet of electrically operated industrial trucks with the corresponding batteries already exists in a plant.

The retrofitting of an industrial truck in accordance with the invention to battery operation is possible simply by replacing the mounting device 13. On the other hand, the mounting device 13 can also be used instead of the batteries in a conventional vehicle, if a sufficient air supply to the device is provided.

In the illustrated exemplary embodiment, the air flow used to cool the units that are installed in the mounting device 13 runs laterally from one side of the vehicle to the other. Because no additional units are attached to the sides of the vehicle, an effective through-flow is possible. A layout of the air lines in the longitudinal direction would be disrupted by the counterweight which is located behind the mounting device 13 and could create an unpleasant draft in the vicinity of the operator's feet. Depending on the gaseous medium used, the air flow in the mounting device 13 should be designed by the suitable placement of ventilation openings so that no flammable mixtures of gases can accumulate in the mounting device 13.

Information can be exchanged between the mounting device 13 and the industrial truck 5 by means of suitable connections, such as a bus system, for example. Control and monitoring devices can be installed in a fixed and permanent manner in the industrial truck for the various operating systems used for the generation of electrical energy, i.e., such as fuel cells, internal combustion engine, and battery. These devices can be located on the driver's control console, thereby making it possible for the operator to have all or most of the information that is important for operation, such as the amount of fuel in the tank or the charging status, operating temperatures or pressures, and enabling the operator to monitor and to intervene in the operation of the individual systems and devices as necessary. The control and monitoring devices can be configured using the technology that is conventional for such devices, such as screens and keyboards.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An industrial truck, comprising:
 spaced axles;
 an electrical drive system; and
 a mounting device configured to support at least one pressure vessel for storage of at least one gaseous medium, wherein the mounting device and associated pressure vessel can be replaced together as a unit, and wherein the mounting device is located in a lower portion of the industrial truck between the spaced axles.

2. The industrial truck as claimed in claim 1, wherein the at least one pressure vessel in the industrial truck is refillable while the pressure vessel and/or the mounting device are installed in the industrial truck.

3. The industrial truck as claimed in claim 1, wherein the mounting device includes additional devices for the generation of electrical energy from the gaseous medium.

4. The industrial truck as claimed in claim 2, wherein the mounting device includes additional devices for the generation of electrical energy from the gaseous medium.

5. The industrial truck as claimed in claim 3, including a fuel cell system configured to generate electrical energy from the gaseous medium.

6. The industrial truck as claimed in claim 1, including a fuel cell system configured to generate electrical energy from the gaseous medium.

7. The industrial truck as claimed in claim 1, wherein a main flow of air supply to devices for the generation of electrical energy from the gaseous medium runs at a right angle to a longitudinal axis of the truck.

8. The industrial truck as claimed in claim 1, wherein control and monitoring devices for operating systems and devices for the generation of electrical energy are permanently installed in the industrial truck.

9. The industrial truck as claimed in claim 8, wherein the control and monitoring devices are located on a driver's control console.

10. The industrial truck as claimed in claim 2, including a fuel cell system configured to generate electrical energy from the gaseous medium.

11. The industrial truck as claimed in claim 1, wherein the industrial truck is a fork-lift truck.

12. An industrial truck, comprising:
 a driver's seat;
 at least two spaced axles; and
 a removable mounting device located between the spaced axles with respect to a longitudinal direction of the truck, wherein the mounting device includes:
  at least one pressure vessel for the storage of at least one gaseous material; and
  a power source connected to the at least one pressure vessel, and
 wherein the mounting device is removably located under the driver's seat.

13. The industrial truck as claimed in claim 12, wherein the power source is a fuel cell system.

14. A fork lift truck, comprising:
 a driver's seat;
 spaced axles; and
 a mounting device removably mounted on the truck below the driver's seat and between the spaced axles, the mounting device comprising:
  at least one pressure vessel for the storage of at least one gaseous material; and
  a fuel cell system connected to the pressure vessel,
 wherein the mounting device, pressure vessel, and fuel cell system are removable as a unit from the fork lift truck.

* * * * *